United States Patent [19]
Beckerman

[11] Patent Number: 5,276,392
[45] Date of Patent: Jan. 4, 1994

[54] SINGLE PHASE AC MOTOR SPEED CONTROL SYSTEM

[75] Inventor: Howard L. Beckerman, Middletown, N.J.

[73] Assignee: Mechanical Ingenuity Corp., Shrewsbury, N.J.

[21] Appl. No.: 974

[22] Filed: Jan. 6, 1993

[51] Int. Cl.⁵ .................. H02P 5/28; H02P 5/415
[52] U.S. Cl. ..................... 318/751; 318/774; 318/817
[58] Field of Search ............ 318/749, 751, 752, 774, 318/776, 816, 817

[56] References Cited

U.S. PATENT DOCUMENTS

| | | | |
|---|---|---|---|
| 3,740,631 | 6/1973 | Fricker et al. | 318/787 |
| 4,455,521 | 6/1984 | Day et al. | 318/798 |
| 4,651,077 | 3/1987 | Woyski | 318/781 |
| 5,159,255 | 10/1992 | Weber | 318/775 |

Primary Examiner—William M. Shoop, Jr.
Assistant Examiner—Brian Sircus
Attorney, Agent, or Firm—David L. Davis

[57] ABSTRACT

A variable speed control system for a single phase AC induction motor wherein a controllable switch is in series with the main winding of the motor, while the auxiliary winding of the motor, which is in series with a capacitor, is continuously energized. The switch is opened whenever the current through the main winding passes through zero. While the switch is open, the back e.m.f. in the main winding is sensed to provide a measure of the speed of the motor. This is compared with a desired speed signal and the comparison is utilized to control closure of the switch. The speed of the motor then remains constant at the desired speed, even with a varying load.

16 Claims, 8 Drawing Sheets

SINGLE PHASE AC MOTOR SPEED CONTROL SYSTEM

BACKGROUND OF THE INVENTION

This invention relates to a speed control system for a single phase AC induction motor and, more particularly, to such a system which maintains a desired speed for the motor under varying load conditions.

Single phase AC induction motors are widely used for driving various types of equipment, from small home appliances to refrigerators to climate control system fans. It is often desirable to be able to control the speed of the motor and maintain a desired speed under varying load conditions. It is therefore a primary object of the present invention to provide a speed control system for a single phase AC induction motor.

Different types of motor speed control systems are presently available. One such type is the inverter type which varies the frequency of the electrical power applied to the motor to control its speed. This is accomplished by an intermediate step of converting the incoming AC power into DC power and then providing a square AC waveform at the desired frequency. Such a system has among its disadvantages the fact that it is relatively expensive to implement and further, that the square AC waveforms produce more heat and noise than conventional sinusoidal AC waveforms. Another common speed control system utilizes the principle of voltage reduction, which lowers the voltage to the motor and allows the rotor to slip under its synchronous speed. While inexpensive, such a system produces waste heat in the motor as well as excessive motor noise or hum. Additionally, the motor can stall in response to a small change in the load. It is therefore a further object of the present invention to provide a motor speed control system which does not suffer from any of the aforementioned disadvantages.

SUMMARY OF THE INVENTION

For a single phase AC induction motor to be able to start, or to run at a speed other than its synchronous speed, it must simulate another phase. It is therefore common to provide an auxiliary winding in addition to the main motor winding, with the axes of the main and auxiliary windings being displaced in space. A common manner of achieving the appropriate time-phase displacement between the currents in the two windings is to provide a capacitor in series with the auxiliary winding. Often, the auxiliary winding and the main winding are connected to each other and to a speed controller. However, in accordance with the principles of this invention, the auxiliary winding is separated from the main winding and is then continuously energized to maintain magnetization of the rotor while a controllable switch is connected in series with the main winding. When the switch is open, the back e.m.f. induced in the main winding by the magnetized rotor is sensed, the back e.m.f. providing a measure of motor speed. This back e.m.f. is compared with a speed reference signal indicative of the desired speed of the motor. The motor load determines the time that the switch is kept open to maintain the speed constant. With a high load, the switch is kept open for a shorter period of time than with a low load. Thus, under varying load conditions, only enough power is supplied to the motor to maintain the motor running at the desired speed.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
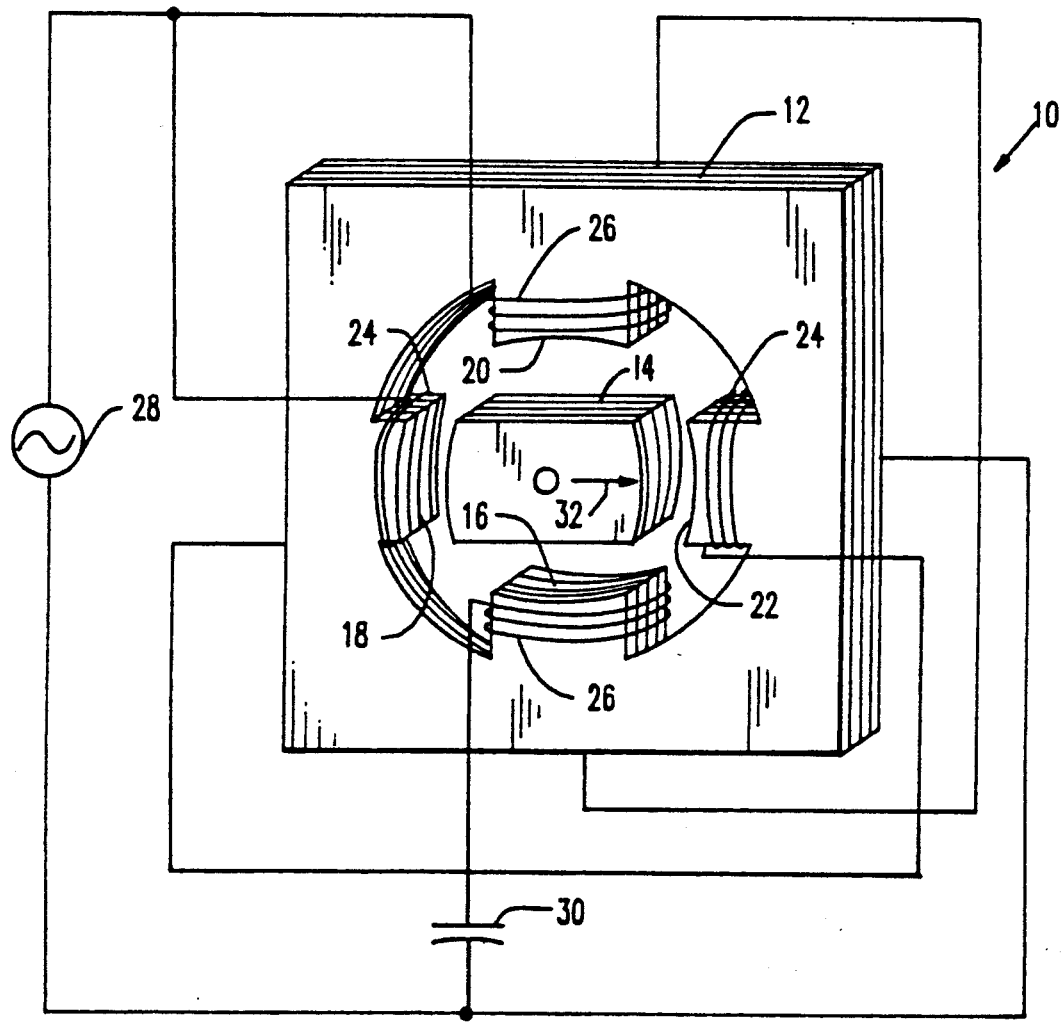
FIG. 1 is a pictorial schematic diagram of a single phase AC induction motor useful for understanding the present invention.

FIG. 1 illustrates a single phase AC induction motor, designated generally by the reference numeral 10, which has a stator 12 and a rotor 14. The stator 12 is typically made up of a stack of iron laminations and, for the purposes of this discussion, is formed with four poles 16, 18, 20 and 22. The rotor 14 also typically is formed of a stack of iron laminations and is arranged to spin on a pair of bearings (not shown). The motor 10 is provided with two sets of windings, a main winding 24 and an auxiliary winding 26. The main winding 24 is wound on the poles 18 and 22. The auxiliary winding 26 is wound on the poles 16 and 20. As shown in FIG. 1, the main winding 24 and the auxiliary winding 26 are connected in parallel and across the single phase AC supply 28, with a capacitor 30 being in series with the auxiliary winding 26.

Figure 2A:
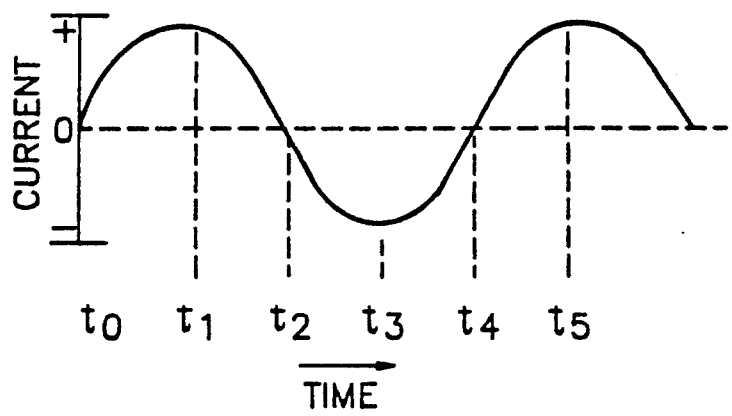
FIGS. 2A and 2B illustrate the currents through the main and auxiliary windings, respectively, of the motor shown in FIG. 1.
Figure 2B:
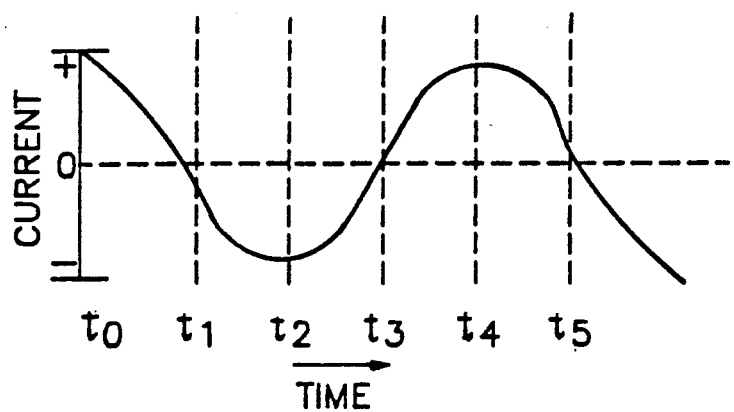

As is known, if the main winding 24 and the auxiliary winding 26 are energized sequentially, the poles 16, 18, 20 and 22 will become magnetized in a circular sequence and cause the rotor 14 to spin, the rotor 14 retaining the magnetization and magnetic polarity induced therein by the windings. This is best explained by referring to FIGS. 2A and 2B, along with FIG. 1.

If power is applied to the motor 10 at time $t_0$, the main winding 24 will have zero current, whereas the auxiliary winding 26 will have peak current. It is noted that the currents through the main winding 24 and the auxiliary winding 26 are phase shifted by 90 degrees. This is due to the presence of the capacitor 30. Thus, at time $t_0$, the rotor 14 will line up with the auxiliary winding 26 and the arrow 32 will point to the pole 16. Magnetization induced in the rotor 14 by the auxiliary winding 26 will be stored in the rotor 14. At time $t_1$, the main winding 24 will have peak current and the auxiliary winding 26 will have zero current. The rotor 14 will attempt to line up with the main winding 24. Because of the stored magnetization in the rotor 14, the rotor 14 will move so that the arrow 32 points to the pole 18. The rotor 14 is repelled from the position where the arrow 32 points to the pole 22.

At time $t_2$, the main winding 24 will have zero current and the current through the auxiliary winding 26 will be at its negative peak. The rotor will then move so that the arrow 32 points to the pole 20. At time $t_3$, the current to the main winding 24 is at its negative peak and the current through the auxiliary winding 26 is at zero. The rotor 14 will spin so that the arrow 32 is pointing to the pole 22. At time $t_4$, the current through the main winding 24 is zero and the current through the auxiliary winding 26 is at its positive peak. The rotor will spin so that the arrow 32 again points to the pole 16.

Thus, a complete revolution of the rotor 14 has occurred during a complete cycle of the AC power. The rotor 14 was therefore synchronized with the power and ran at sixty revolutions per second, or 3600 revolutions per minute. This is known as synchronous rotation. The present invention is concerned with non-synchronous rotation of the motor.

In an AC motor which is not running at synchronous speed, timing of the energization of the main and auxiliary windings is critical. Thus, the main winding 24 and the auxiliary winding 26 must be energized at the right time with current of the proper polarity. An extreme example is if the rotor 14 is mechanically prevented from rotating. If the locked condition is as illustrated in FIG. 1, with the arrow 32 pointing to the pole 22, and power is applied, the main winding 24 will magnetize the rotor 14 and the auxiliary winding 26 will try to move the rotor 14 out of position in a clockwise direction. The clockwise magnetic energy bursts would occur four times per cycle. Each magnetic burst applies a quantum of clockwise rotational energy to the rotor 14, which is illustratively called a "bump". If the rotor 14 is placed in any position and held there, it will still receive four bumps during each cycle of the AC power. Assuming that the rotor 14 is allowed to rotate at a given speed but is coupled to a load, the load takes some amount of energy from the rotor. If the magnitude of the bumps are controlled so that they apply an amount of energy to the rotor 14 which is equal to the energy used by the load, the load will rotate at that speed. If the magnitude of the bumps are reduced, the speed of the load will be reduced until the bump energy into the rotor equals the energy taken out of the rotor by the load. In accordance with this invention, the magnitude of the bumps are controlled.

Figure 3:
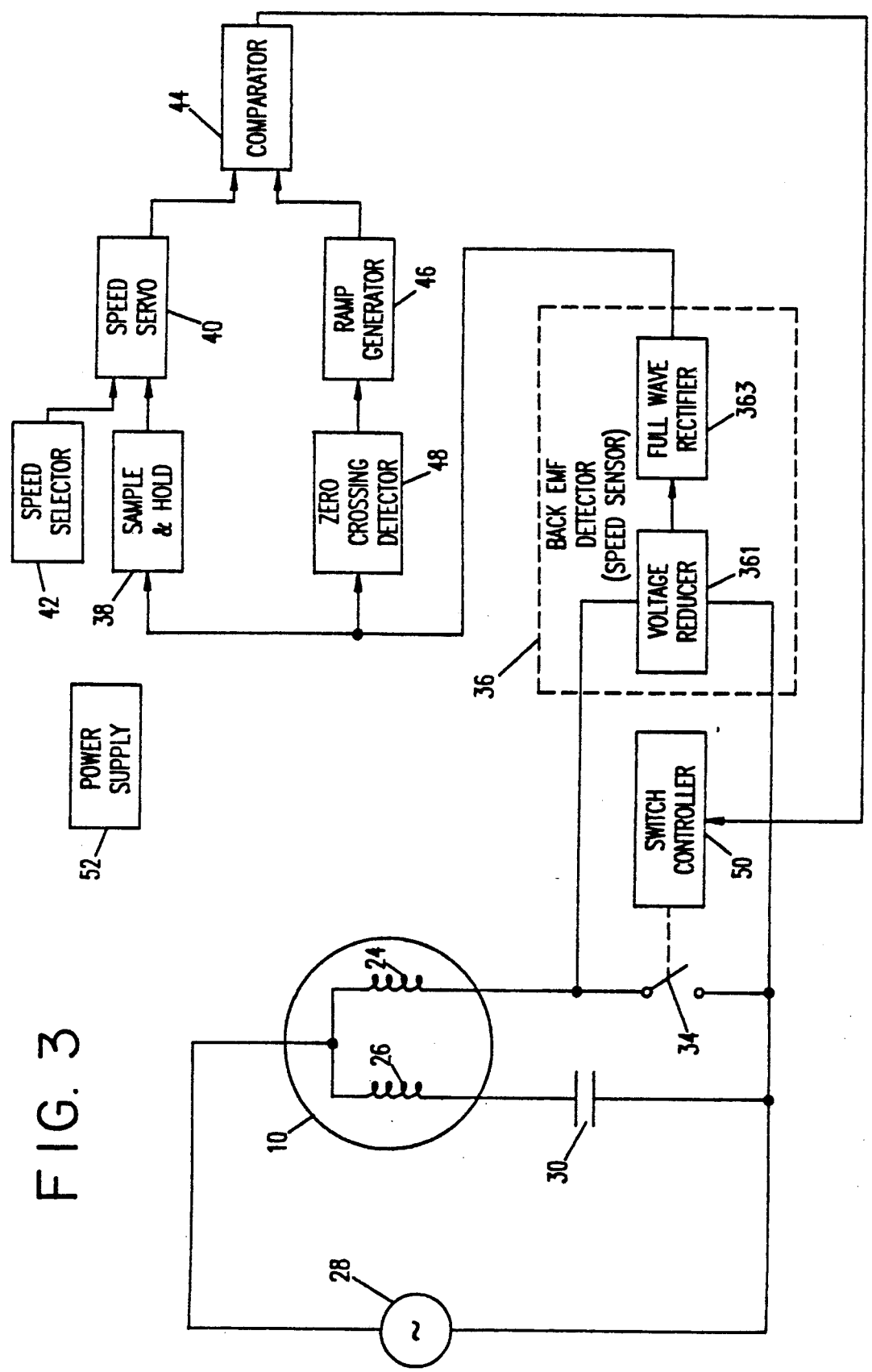
FIG. 3 is a block diagram of an illustrative system embodying the principles of this invention for controlling the speed of a single phase AC induction motor.

Audio noise in single phase motors typically has a frequency peak at 240 Hertz for 60 Hertz input power. This corresponds to the four energy bumps per cycle banging away at the sound conductive components of the motor. By keeping the magnitude of the bump energy into the rotor to a minimum, the resultant noise is reduced. Referring now to FIG. 3, according to the present invention a controllable switch 34 is connected in series with the main winding 24 to selectively provide a conductive path through the main winding 24 for power from the AC supply 28. Power is allowed to flow continuously through auxiliary winding 26, the path through the auxiliary winding 26 including the capacitor 30. Due to the presence of the capacitor 30, current through the auxiliary winding 26 is 90 degrees out of phase with the AC supply 28. The rotor 14 (FIG. 1) will not spin unless the switch 34 is closed. (However, if the rotor 14 is spinning and the switch 34 is opened, the inertia of the spinning rotor will allow it to continue spinning, although it is slowed down by the load thereon.)

If the magnetized rotor 14 is spinning, a voltage will be induced in the main winding 24, this voltage being commonly called the back e.m.f. of the motor. This back e.m.f. is produced by the magnetic field which is stored in the rotor 14 by the auxiliary winding 26, and its magnitude is proportional to the rotational speed of the rotor. Measurement of the back e.m.f. can therefore provide a way of determining the speed of the motor. However, if the switch 34 is closed, the back e.m.f. signal is swamped by the voltage from the AC supply 28. According to the present invention, as will be explained in full detail hereinafter, the switch 34 is selectively closed to provide power to run the motor and, when the switch 34 is open, the back e.m.f. across the main winding 24 is sensed to provide a measure of the speed of the motor.

The switch 34 is opened whenever the current through the main winding 24 is zero. If the switch 34 were to be opened while there is current in the main winding 24, the magnetic field of the winding 24 would collapse and induce a voltage which will mask the back e.m.f. The present invention carefully controls the timing of the closure of the switch 34, depending on the magnitude of the bump needed to run the load at the desired speed. The closure is synchronized with the sine wave of the supply 28 by timing from the zero current point. A short time delay before closure results in a big bump, whereas a long time delay before closure results in a small bump.

The speed of the motor 10 is sensed by the back e.m.f. detector 36 which is coupled to the switch 34 and is operative when the switch 34 is open. The detector 36 includes a voltage reducer 361 which lowers the power line voltage to a useable level and a full wave rectifier 363. Since the back e.m.f. voltage is a varying signal, typically sinusoidal, the sample and hold circuit 38 provides to the speed servo 40 a signal which is representative of the maximum absolute value of the output of the full wave rectifier 363. The other input to the speed servo 40 is from the speed selector 42, which provides a signal representative of the desired speed for the motor 10. The servo 40 provides one input to the comparator 44. The other input to the comparator 44 is from the ramp generator 46 which provides a monotonically increasing ramp voltage which starts at the time the switch 34 is opened (i.e., at the zero current point). The zero current point is determined by the zero crossing detector 48, which is coupled to the back e.m.f. detector 36. The comparator 44 compares the signals received from the speed servo 40 and the ramp generator 46 and, based upon such comparison, provides an appropriate signal to the switch controller 50 to close the switch 34. Power to all of this circuitry is provided from the power supply 52 which is coupled to the AC supply 28 and converts AC power from the supply 28 into a suitable form for use by the circuitry.

Figure 4:
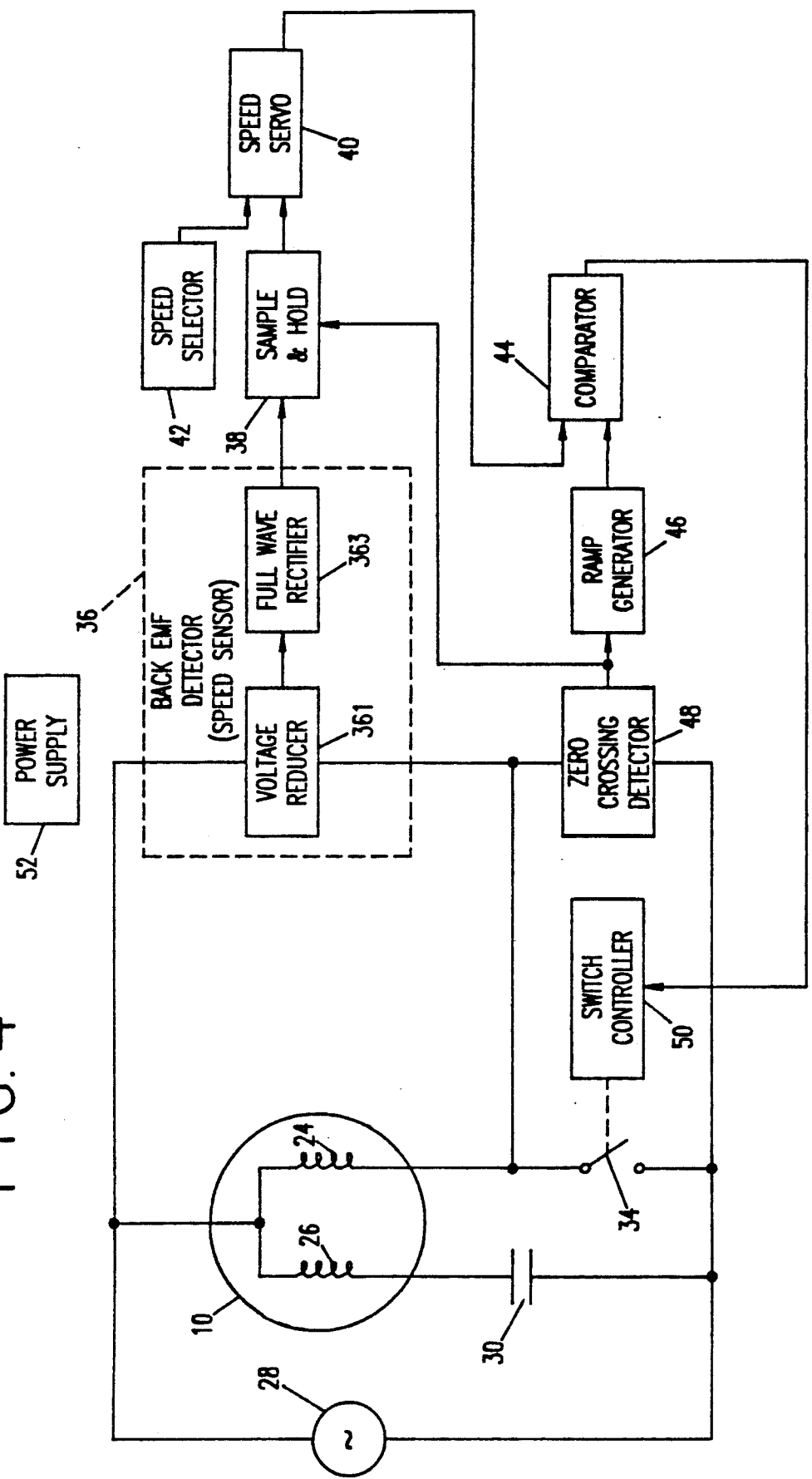
FIG. 4 is a block diagram of an alternate embodiment similar to that of FIG. 3.

FIG. 4 shows a block diagram similar to FIG. 3 wherein the circuit blocks have been rearranged. Thus, the voltage reducer 361 is across the main winding 24 rather than across the switch 34. In this case, the back e.m.f. of the motor 10 is measured directly, rather than being substracted from the supply voltage as is the case with the system shown in FIG. 3. Also, in FIG. 4, the zero crossing detector 48 is across the switch 34 and provides a signal to the sample and hold circuit 38 so that only when the switch 34 is open does the sample and hold circuit 38 provide a signal to the speed servo 40 which is representative of the back e.m.f.

Figure 5:
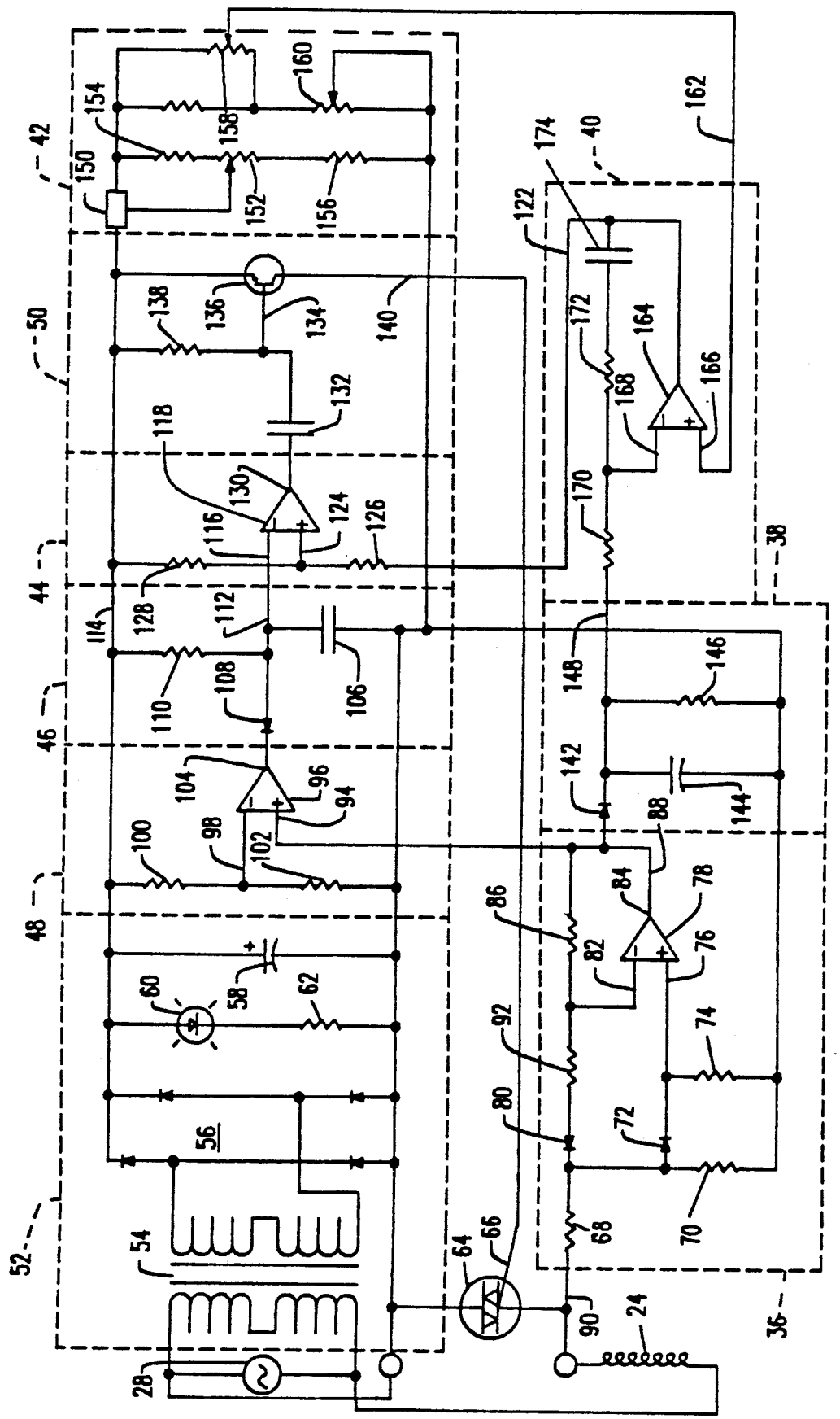
FIG. 5 is a detailed schematic circuit diagram of an illustrative implementation of the block diagram shown in FIG. 3.

Referring now to FIG. 5, the power supply 52 includes the transformer 54, the full wave diode bridge 56 and the capacitor 58. The light emitting diode 60 is energized through the dropping resistor 62 when power is on.

Illustratively, the function of the switch 34 is provided by the triac 64, having a control gate terminal 66. The triac 64 has the inherent characteristic that when the current going through it drops below a predetermined holding current, the triac becomes non-conductive and remains in the non-conductive state until it receives a trigger signal at the gate 66.

The back e.m.f. detector (speed sensor) 36 includes the resistors 68 and 70 which form a voltage divider to reduce the power line voltage to a useable level. Thus, the resistors 68 and 70 function as the voltage reducer 361. When the triac 64 is conductive, the resistors 68 and 70 are short circuited. When the triac 64 is open, the diode 72 conducts positive half cycles of the supply 28 through the resistor 74 and into the non-inverting input 76 of the operational amplifier 78. Since the diode 80 is open circuited during the positive half cycles, the operational amplifier 78 acts like a voltage follower with its inverting input terminal 82 connected to its output terminal 84 through the resistor 86. Therefore, the voltage on the output lead 88 of the speed sensor 36 follows the input voltage on the lead 90. The voltage on the lead 90 is equal to the back e.m.f. in the main winding 24 subtracted from the line voltage of the supply 28.

During negative half cycles of the voltage on the lead 90, the diode 80 is conductive and the diode 72 is non-conductive. The current during these half cycles passes through the resistor 92 to the inverting input 82 of the operational amplifier 78. The resistors 92 and 86 form a feedback loop for the operational amplifier 78 with unity gain, so the negative half cycles are inverted and presented at the output terminal 84 as a positive waveform. Accordingly, the speed sensor 36 functions as a full wave rectifier of a reduced representation of the signal on the lead 90.

The zero crossing detector 48 utilizes the inherent characteristic of the triac 64 that when the current through the triac 64 drops below a predetermined holding current, the triac 64 becomes non-conductive and remains so until it is turned on by a trigger pulse at the gate terminal 66. The output of the speed sensor 36 on the lead 88 is compared at the non-inverting input 94 of the operational amplifier 96 to a fixed voltage at the inverting input terminal 98. This fixed voltage at the terminal 98 is provided by a voltage divider including the resistors 100 and 102 connected across the output of the power supply 52. If the triac 64 is conductive, the lead 88 will be low and therefore the output terminal 104 of the operational amplifier 96 will be low. When the current through the triac 64 drops below the predetermined holding current (essentially zero), the voltage across the triac 64 jumps and the voltage on the lead 88 goes high, which causes the signal on the output terminal 104 to go high, staying high until the triac 64 again becomes conductive. The transition of the signal on the terminal 104 from low to high functions to define the zero crossing point, for the purposes of the disclosed circuitry.

When the triac 64 is conductive, the output terminal 104 is low, holding the capacitor 106 of the ramp generator 46 discharged through the diode 108. When the triac 64 turns off, at the zero crossing point, the output terminal 104 goes high and open circuits (back biases) the diode 108. The capacitor 106 therefore charges through the resistor 110, creating a ramp voltage on the lead 112 which starts from a predetermined level (slightly above zero) and monotonically increases until either the triac 64 turns on or the voltage reaches the supply voltage on the lead 114.

The comparator 44 compares the ramp voltage on the lead 112, which is applied to the inverting input 116 of the operational amplifier 118, to the servo voltage on the lead 122 which is applied to the non-inverting input 124 of the operational amplifier 118 through the resistor 126. Since the ramp voltage on the lead 112 does not go to zero, the resistors 126 and 128 insure that the servo voltage on the lead 122 cannot go below the ramp voltage minimum. If the servo voltage to the non-inverting input 124 of the operational amplifier 118 goes below the ramp voltage to the inverting input 116, the output 130 of the operational amplifier 118 goes low. As will be discussed hereinafter, this causes the triac 64 to be turned on, which brings the ramp low again and the output 130 again goes high. The lower the servo voltage on the lead 122, the earlier in the power cycle the comparator 44 triggers. The time interval between zero current and the turning on of the triac 64 is inversely related to how much power is applied to the main winding 24.

Triggering of the triac 64 is performed by the controller 50. When the output 130 of the operational amplifier 118 goes low, this transition is capacitively coupled through the capacitor 132 to the base 134 of the transistor 136. The resistor 138 holds the base 134 normally high. The collector 140 of the transistor 136 is connected to the gate 66 of the triac 64. When the base 134 goes low to turn on the transistor 136, the collector 140 goes high to provide a trigger pulse to the gate 66 which turns on the triac 64. Current to the gate 66 is limited by the gain of the transistor 136 and its base current.

Returning now to the speed sensing aspect of the disclosed system, the output from the speed sensor 36 on the lead 88 is supplied to the sample and hold circuit 38. The signal on the lead 88 is conducted through the diode 142 to charge the capacitor 144. The capacitor 144 holds the peak voltage while the resistor 146 provides a slow bleed. Thus, the voltage on the lead 148 is the maximum absolute value of the output of the speed sensor 36.

The speed selector 42 includes a voltage regulator 150 which maintains the selected speed setting voltage constant. The potentiometer 152 adjusts the minimum speed by adjusting the output of the voltage regulator 150. The resistors 154 and 156 control the range of adjustment of the potentiometer 152. The potentiometer 158 provides the desired speed setting, with the potentiometer 160 setting the maximum speed.

The speed servo 40 compares the speed set point from the potentiometer 158 on the lead 162 to the output from the sample and hold circuit 38 on the lead 148. The speed servo 40 includes an operational amplifier 164 with its output terminal connected to the lead 122, which goes to the comparator 44, and its non-inverting input terminal 166 coupled to the lead 162. The inverting input terminal 168 of the operational amplifier 164 is connected to the junction of the resistors 170 and 172, which form a feedback loop with approximately unity AC gain which reacts to fast changing signals. The capacitor 174 functions as an integrator which reacts to slow changes to provide substantially infinite DC gain.

Figure 6:
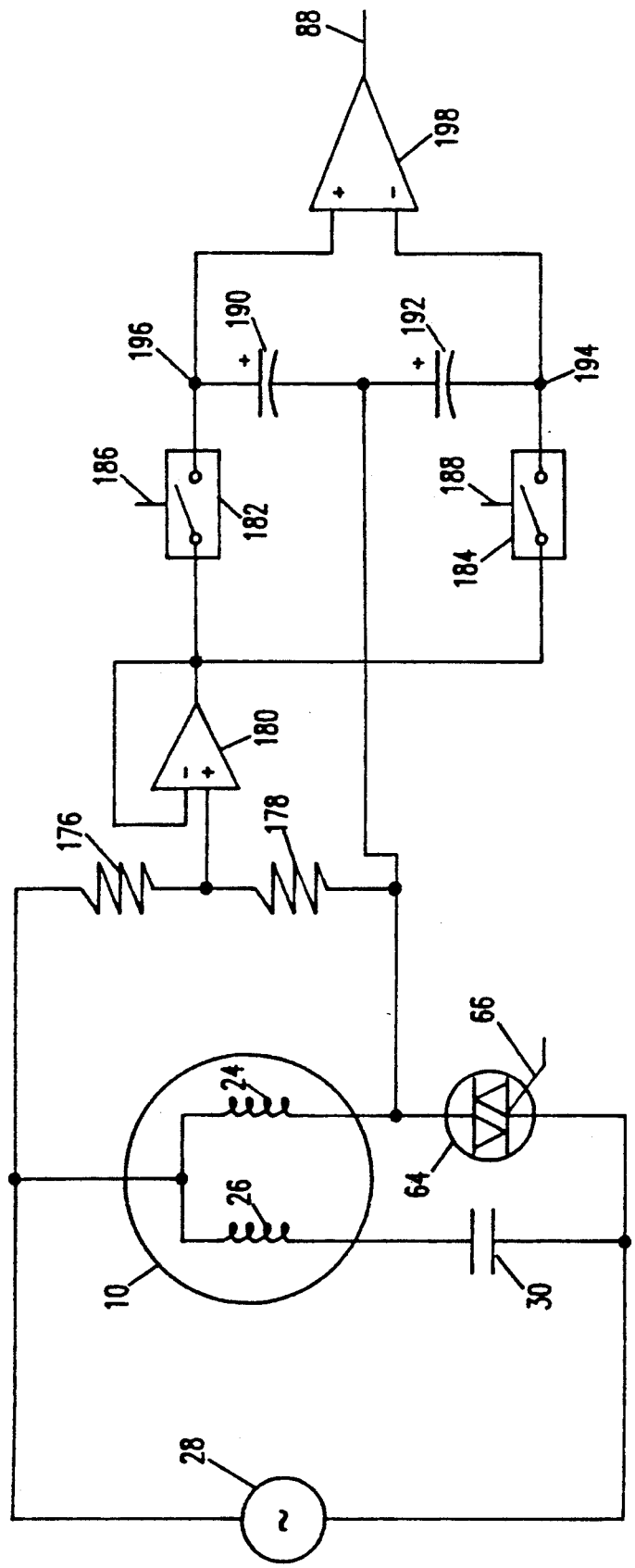
FIG. 6 is a schematic diagram of an alternate embodiment for the speed sensor.

FIG. 6 illustrates an alternate embodiment for the speed sensor 36. The resistors 176 and 178 reduce the voltage across the main winding 24 down to a more useable level. The operational amplifier 180 is configured as a voltage follower which does not place a load on the resistors 176 and 178 and therefore does not distort the readings of the back e.m.f. The switches 182 and 184 are FET electronic switches controlled (by logic signals from apparatus not shown) on their gates 186 and 188, respectively, so that the switch 182 is closed approximately 0.2 milliseconds after the triac 64 turns off on the positive half cycle for a period of 0.2 milliseconds. This stores the positive half of the back e.m.f. on the capacitor 190. The switch 184 is closed 0.2 milliseconds after the triac 64 turns off on the negative half cycle for a period of 0.2 milliseconds. This stores the negative half of the back e.m.f. on the capacitor 192. By substracting the voltage on the lead 194 from the voltage on the lead 196 in the operational amplifier 198, the back e.m.f. is provided on the lead 88.

Figure 7:
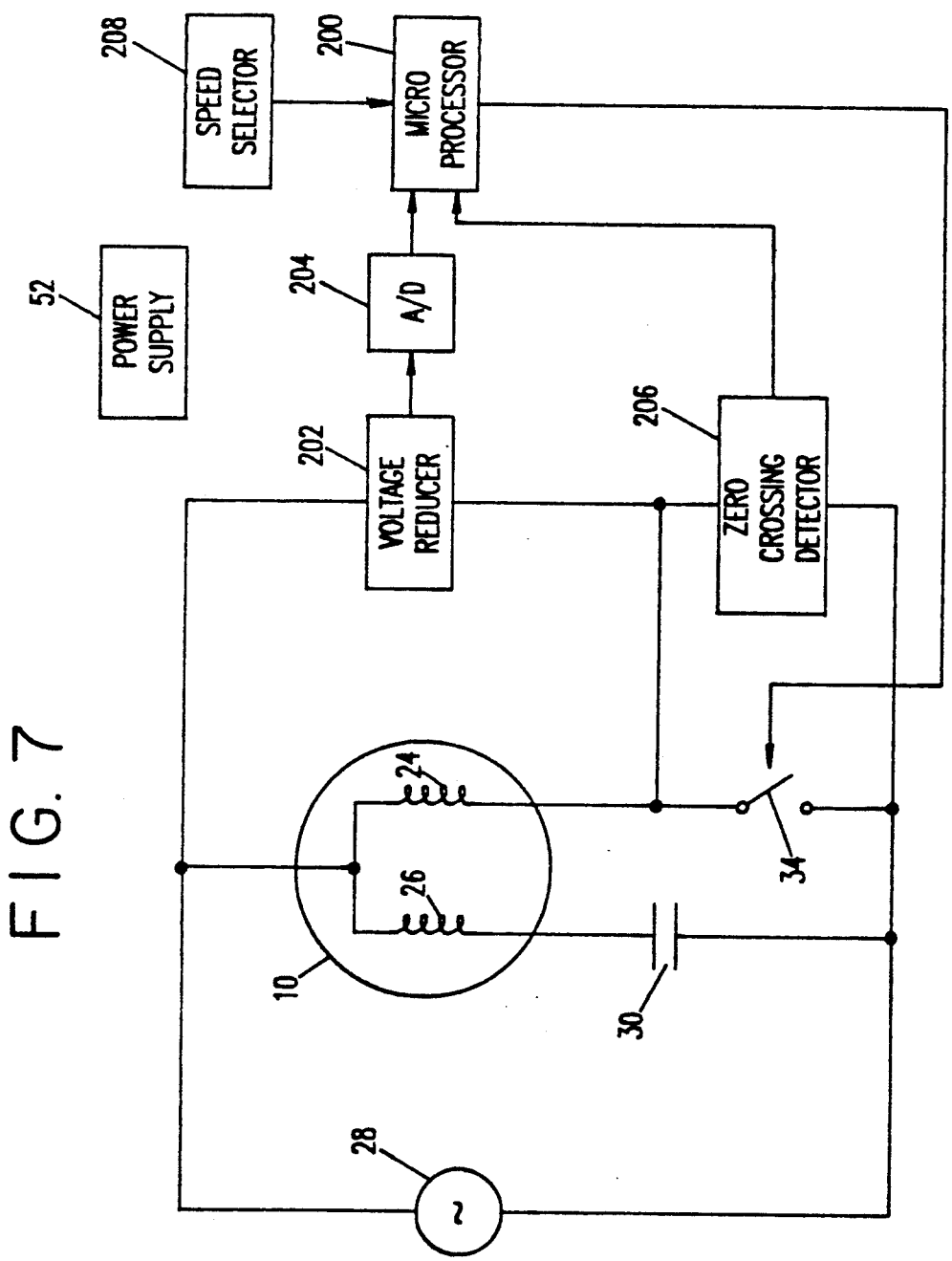
FIG. 7 illustrates a microprocessor based embodiment of the present invention.

FIG. 7 illustrates an arrangement wherein a programmed microprocessor 200 performs the functions of the majority of the circuit blocks shown in FIG. 3. As shown in FIG. 7, the voltage reducer 202 provides isolation and reduction for the voltage across the main winding 24, and applies this voltage to the analog to digital converter 204. The voltage reducer 202 may illustratively be a step down transformer. The analog to digital converter 204 converts the reduced main winding voltage to a digital number which is provided to the microprocessor 200. The zero crossing detector 206 provides a signal to the microprocessor 200 when the current through the main winding 24 is zero so that the microprocessor can open the switch 34. The microprocessor 200 stores the voltage which occurs 0.2 milliseconds after the switch 34 is opened during a positive half cycle in a first memory location. It stores in a second memory location, the main winding voltage which occurs 0.2 milliseconds after the switch 34 is opened during a negative half cycle. Subtraction between these two stored numbers results in a number which corresponds to the back e.m.f. This number is stored in a third memory location and is used for comparison with a set point number, illustratively provided by the speed selector 208, to determine when to close the switch 34.

Figure 8A:
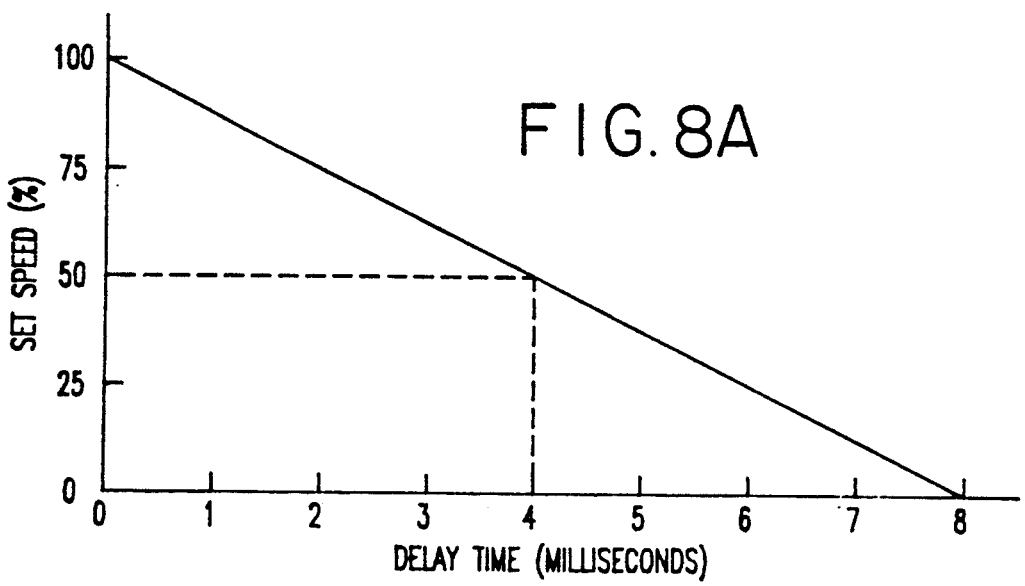
FIGS. 8A, 8B and 8C are diagrams of delay time versus desired motor speed useful for understanding the operation of this invention.
Figure 8B:
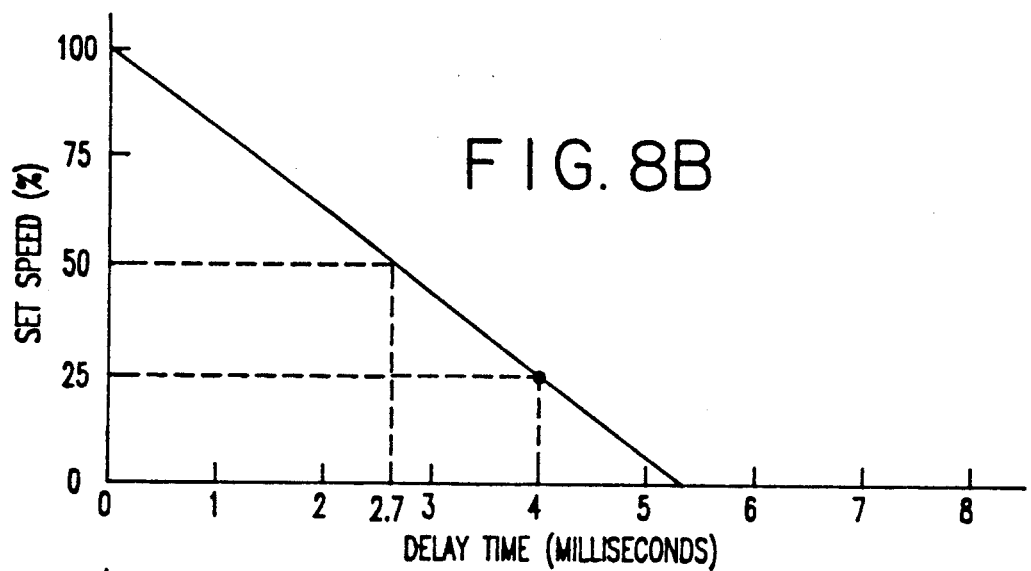
Figure 8C:
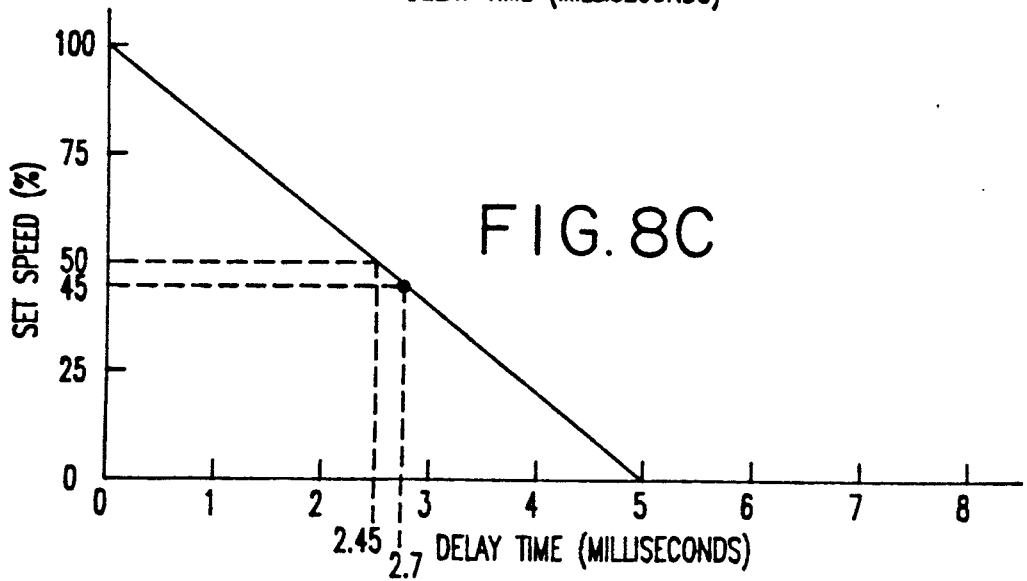

Both the digital servo shown in FIG. 7 and the analog servo shown in FIG. 5 utilize successive approximations to determine exactly when to turn on the triac 64. FIGS. 8A–8C provide a conceptual illustration of successive approximations. Assuming that a half cycle of the supply 28 occurs in 8 milliseconds, it is known that if the desired speed of the motor is to be the full speed, then the delay time after zero crossing for turning on the triac 64 is at zero milliseconds. Conversely, if the motor is not to be run at all (zero speed), then the delay time for turning on the triac 64 is the full 8 milliseconds. Therefore, a delay time versus speed curve can be drawn as shown in FIG. 8A. A straight line as shown in FIG. 8A provides a good approximation. Assuming that it is desired to run the motor at half speed, initially the selected delay time is chosen from FIG. 8A to be 4 milliseconds. The next time that the back e.m.f. is sensed, the delay time is changed. Assuming that the speed is sensed to be 25% of full speed, a new curve is drawn as shown in FIG. 8B. To derive that straight line, it is known that the full speed zero delay time is fixed and the 25% speed 4 millisecond delay time has been measured. Therefore, a new approximation of delay time to obtain 50% speed is chosen to be approximately 2.7 milliseconds. Assume that the next back e.m.f. measured shows that the motor is running at 45% of full speed. Then the line shown in FIG. 8C is generated. The next approximation for delay time is then 2.45 milliseconds. These approximations continue.

The microprocessor 200 is programmed to generate the curves and make the approximations, whereas the analog servo 40 shown in FIG. 5 does this inherently.

According, there has been disclosed an improved single phase AC motor speed control system. While illustrative embodiments of the present invention have been disclosed herein, it is understood that various modifications and adaptations to the disclosed embodiments will be apparent to those of ordinary skill in the art and it is only intended that this invention be limited by the scope of the appended claims.

I claim:

1. A speed control system for a single phase AC induction motor having a main winding and an auxiliary winding, the system comprising:
    means for providing continuous energization to said auxiliary winding so as to maintain magnetization of the rotor of said motor;
    means for connecting one end of said main winding to a first terminal of a single phase AC supply;
    a controllable switch connected between the second end of said main winding and the second terminal of said single phase AC supply, said switch having an open state and a closed state and selectively providing a conductive path for power from said AC supply through said main winding when said switch is in its closed state;
    speed reference means for providing a first electrical signal representative of a desired speed for said motor;
    speed sensing means coupled to said switch and operative when said switch is in its open state for sensing the back e.m.f. induced across said main winding and providing a second electrical signal in dependence on the sensed back e.m.f. which is representative of the actual speed of said motor; and
    control means responsive to said first and second electrical signals for controlling the state of said switch so as to cause said motor to run at said desired speed.

2. The system according to claim 1 further including means for sensing the current through said main winding and providing a zero crossing signal to said control means when said main winding current is zero, and wherein said control means is responsive to said zero crossing signal for opening said switch.

3. The system according to claim wherein said speed sensing means is connected across said switch and senses a voltage equal to the back e.m.f. subtracted from the voltage of said AC supply when said switch is in its open state, said speed sensing means providing said second electrical signal at a null level when said switch is in its closed state.

4. The system according to claim 1 wherein:
    said switch comprises a triac having a conductive state and a non-conductive state; and
    said control means includes zero crossing detector means coupled to said triac, said zero crossing detector means providing a zero crossing signal in response to said triac becoming non-conductive due to the current therethrough dropping below the holding current of said triac.

5. The system according to claim 4 wherein said control means further includes:
- sample and hold means coupled to receive said second electrical signal from said speed sensing means and providing a third electrical signal representative of the maximum absolute value of said second electrical signal;
- servo means coupled to receive said third electrical signal and said first electrical signal for providing a fourth electrical signal corresponding to the difference therebetween;
- ramp means coupled to receive said zero crossing signal for providing a ramp voltage which starts from a predetermined level in response to said zero crossing signal; and
- comparator means coupled to receive said ramp voltage and said fourth electrical signal, said comparator means being operative to cause said triac to become conductive when said ramp voltage reaches a level set by said fourth electrical signal.

6. The system according to claim 1 wherein said speed sensing means includes:
- voltage reducing means for providing a sense voltage indicative of the voltage across said main winding; and
- full wave rectifying means coupled to receive said sense voltage and providing said second electrical signal as the absolute value of said sense voltage.

7. The system according to claim 6 wherein said switch comprises a triac having a conductive state and a non-conductive state, said triac becoming non-conductive when the current therethrough drops below a predetermined holding current, said speed sensing means providing said second electrical signal at a null level when said triac is in its conductive state and with a waveform representative of the back e.m.f. of said motor when said triac is in its non-conductive state, and said control means includes:
- zero crossing detector means coupled to receive said second electrical signal for providing a zero crossing signal at a first predetermined level when said second electrical signal is at other than said null level and at a second predetermined level when said second electrical signal is at said null level, said zero crossing detector means including an operational amplifier having its inverting input terminal coupled to a fixed voltage reference, its non-inverting input terminal coupled to the output terminal of said speed sensing means operational amplifier, and its output terminal providing said zero crossing signal;
- ramp means coupled to the output terminal of said zero crossing detector means operational amplifier for providing an output voltage which monotonically increases from a first level so long as said zero crossing signal is at said first predetermined level, said ramp means being effective to provide its output voltage at said first level when said zero crossing signal is at said second predetermined level;
- servo means coupled to said speed reference means and said speed sensing means for providing a servo output signal indicative of the difference between the desired speed for said motor and the actual speed of said motor; and
- comparator means coupled to receive said servo output signal and said ramp means output voltage and operative to cause said triac to become conductive when said ramp means output voltage reaches a second level set by said servo output signal.

8. The system according to claim 7 wherein said servo means comprises:
- an operational amplifier having an inverting input terminal, a non-inverting input terminal, and an output terminal providing said servo output signal;
- first coupling means including a series connected first resistor for coupling said servo means operational amplifier inverting input terminal to said speed sensing means operational amplifier output terminal;
- second coupling means for coupling said servo means operational amplifier non-inverting input terminal to receive said first electrical signal from said speed reference means; and
- feedback means coupled between the output terminal and the inverting input terminal of said servo means operational amplifier, the feedback means including a series connection of a second resistor and a first capacitor.

9. The system according to claim 8 wherein said first coupling means includes sample and hold means coupled to receive said second electrical signal from said speed sensing means operational amplifier output terminal and providing to said servo means operational amplifier inverting input terminal a third electrical signal representative of the maximum absolute value of said second electrical signal.

10. The system according to claim 8 wherein said comparator means comprises:
- an operational amplifier having an inverting input terminal, a non-inverting input terminal, and an output terminal;
- third coupling means for coupling said comparator means operational amplifier inverting input terminal to receive said ramp means output voltage;
- fourth coupling means for coupling said comparator means operational amplifier non-inverting input terminal to said servo means operational amplifier output terminal, the fourth coupling means including serially connected third and fourth resistors connected between the servo means operational amplifier output terminal and a reference voltage and means for connecting the comparator means operational amplifier non-inverting input terminal to the junction between said third and fourth resistors;
- a transistor having its emitter-collector path in series between said reference voltage and the gate of said triac;
- a second capacitor connected between said comparator means operational amplifier output terminal and the base of said transistor; and
- a fifth resistor connected between the base of said transistor and said reference voltage.

11. The system according to claim 7 wherein said ramp means comprises:
- a diode having its cathode connected to said zero crossing detector means operational amplifier output terminal and its anode connected to said comparator means;
- a sixth resistor connected between said diode anode and a first reference voltage; and
- a third capacitor connected between said diode anode and a second reference voltage, said second reference voltage being equal to said first level and less than said first reference voltage.

12. The system according to claim 11 wherein said servo means comprises:
   an operational amplifier having an inverting input terminal, a non-inverting input terminal, and an output terminal providing said servo output signal;
   first coupling means including a series connected first resistor for coupling said servo means operational amplifier inverting input terminal to said speed sensing means operational amplifier output terminal;
   second coupling means for coupling said servo means operational amplifier non-inverting input terminal to receive said first electrical signal from said speed reference means; and
   feedback means coupled between the output terminal and the inverting input terminal of said servo means operational amplifier, the feedback means including a series connection of a second resistor and a first capacitor.

13. The system according to claim 12 wherein said comparator means comprises:
   an operational amplifier having an inverting input terminal, a non-inverting input terminal, and an output terminal;
   third coupling means for coupling said comparator means operational amplifier inverting input terminal to said third diode anode of said ramp means;
   fourth coupling means for coupling said comparator means operational amplifier non-inverting input terminal to said servo means operational amplifier output terminal, the fourth coupling means including serially connected third and fourth resistors connected between the servo means operational amplifier output terminal and a reference voltage and means for connecting the comparator means operational amplifier non-inverting input terminal to the junction between said third and fourth resistors;
   a transistor having its emitter-collector path in series between said reference voltage and the gate of said triac;
   a second capacitor connected between said comparator means operational amplifier output terminal and the base of said transistor; and
   a fifth resistor connected between the base of said transistor and said reference voltage.

14. The system according to claim 6 wherein said control means only responds to said second electrical signal during a period of time when said switch is open.

15. The system according to claim wherein said means for providing continuous energization to said auxiliary winding includes:
   a fourth capacitor; and
   means for providing a series connection across said single phase AC supply for said auxiliary winding and said fourth capacitor.

16. The system according to claim 1 wherein said switch assumes its open state every time the current through said main winding drops below a predetermined threshold value and said control means includes a microprocessor programmed to utilize successive approximations to determine the timing for closing said switch.

* * * * *

UNITED STATES PATENT OFFICE
CERTIFICATE OF CORRECTION

Patent No. 5,276,392              Dated  Jan. 4, 1994

Inventor(s)  Howard L. Beckerman

It is certified that error appears in the above-identified patent and that said Letters Patent is hereby corrected as shown below:

Column 12, line 19, after "claim", insert -- 1 --.

Signed and Sealed this

Twenty-sixth Day of April, 1994

Attest:

BRUCE LEHMAN

*Attesting Officer*   *Commissioner of Patents and Trademarks*